(12) United States Patent
Combret

(10) Patent No.: US 8,720,863 B2
(45) Date of Patent: May 13, 2014

(54) APPARATUS FOR STRINGING A LINE UNDERNEATH A CROSS MEMBER

(75) Inventor: Olivier Combret, Kaleden (CA)

(73) Assignee: VMR Aviation Ltd., Kaleden, B.C. (CA)

( * ) Notice: Subject to any disclaimer, the term of this patent is extended or adjusted under 35 U.S.C. 154(b) by 239 days.

(21) Appl. No.: 13/434,268

(22) Filed: Mar. 29, 2012

(65) Prior Publication Data

US 2013/0256612 A1    Oct. 3, 2013

(51) Int. Cl.
*B66D 1/36*    (2006.01)
(52) U.S. Cl.
USPC ............. 254/134.3 PA; 254/134.3 R; 258/1.2
(58) Field of Classification Search
CPC ....... B66D 1/36; H02G 1/00; H02G 2001/00; H02G 2200/00
USPC ..................... 254/134.3 PA, 134.3 R; 258/1.2
See application file for complete search history.

(56) References Cited

U.S. PATENT DOCUMENTS

| | | | | |
|---|---|---|---|---|
| 1,438,329 A * | 12/1922 | Pleister | ................ | 254/134.3 PA |
| 1,552,161 A * | 9/1925 | Houghton | ..................... | 254/417 |
| 2,130,464 A * | 9/1938 | Jacobsen | ....................... | 254/127 |
| 2,174,427 A * | 9/1939 | Taylor | .................. | 254/134.3 PA |
| 2,613,256 A * | 10/1952 | Thomas | ................ | 254/134.3 PA |
| 3,863,897 A * | 2/1975 | Yeager | .................... | 254/134.3 R |
| 4,006,884 A * | 2/1977 | Lederhos et al. | .... | 254/134.3 PA |
| 4,201,369 A * | 5/1980 | Betta | ......................... | 242/157 R |
| 4,247,084 A * | 1/1981 | Lindsey et al. | ...... | 254/134.3 PA |
| 4,278,237 A * | 7/1981 | Bergman et al. | ..... | 254/134.3 PA |
| 4,328,952 A * | 5/1982 | Chapman | ................ | 254/134.3 R |
| 4,487,395 A * | 12/1984 | Despins | ................. | 254/134.3 R |
| 4,494,732 A * | 1/1985 | Waymire | ............... | 254/134.3 R |
| 4,523,746 A * | 6/1985 | Chapman | ...................... | 258/1.2 |
| 4,531,714 A * | 7/1985 | Bahr | ...................... | 254/134.3 R |
| 6,315,269 B1 * | 11/2001 | Fleury et al. | ......... | 254/134.3 PA |
| 8,398,057 B2 * | 3/2013 | Tukachinsky | ........ | 254/134.3 PA |

* cited by examiner

*Primary Examiner* — George Nguyen
(74) *Attorney, Agent, or Firm* — Adrian D. Battison; Ade & Company Inc.

(57) ABSTRACT

A stringing apparatus for stringing a sock-line, optionally a phase line, within a closed framed opening of a power line tower of H-frame, portal or corset type uses a helicopter for pulling the sock-line where the stringing apparatus is suspended from the helicopter by a tow-line and the sock-line is fastened to it. The stringing apparatus comprises an arcuate channel which is attached to the sock-line and a rotating open spoke star-wheel defining legs the ends of which travel inside the channel and allows a continuous revolution of the star wheel thus allowing the closed frame cross member to travel through one of the gaps between the legs while the sock-line passes to the underside of the cross member and the tow line passes over the cross member.

19 Claims, 8 Drawing Sheets

APPARATUS FOR STRINGING A LINE UNDERNEATH A CROSS MEMBER

The present invention relates to a stringing apparatus to facilitate stringing a line underneath a cross member, for example through an opening. This is particularly but not exclusively proposed in relation to helicopter-drawn pilot lines for threading the lines underneath a cross member and into for example H-frame, portal, or corset type power line towers, where one or more lines are intended to be suspended within the frame of the tower.

BACKGROUND OF THE INVENTION

When constructing a power line, it is convenient to use a helicopter for stringing a sock-line which acts as a pilot line to pull through the eventual power line to the suspended position.

In the case of phase lines and top lines which are suspended outside the tower frame, the helicopter can simply lay the sock-lines directly into open line stringing support blocks provided with a closing mechanism to hold the sock-line.

When the sock-line has been positioned within its support blocks on all the towers, the phase line, which is connected to the remote end of the sock-line, is then pulled though the support blocks into place in the usual manner and connected to insulators provided on the tower, and the line stringing support blocks removed.

For those phase lines which are suspended within a closed framed of the tower, for instance underneath the cross member on a portal tower, it is not however possible to string the line directly in this manner since the support cable from the helicopter must pass over the cross-member while the sock-line must pass underneath the cross-member. The sock-line must therefore first be guided into the frame, underneath the cross member, before it can be laid in its line stringing support block.

SUMMARY OF THE INVENTION

It is one object of the invention to provide a pilot line stringing apparatus which does not require any special pre-arrangements on the tower, which permits automatic positioning of the line within the tower frame in just a few seconds with only relatively simple maneuvers being required of the helicopter pilot, and which permits the operation to be performed in any weather conditions under which a helicopter is normally allowed to fly.

According to one aspect of the invention there is provided an apparatus for attachment to a tow line of a helicopter for stringing a sock-line underneath a cross member of a power line tower comprising:

a first member for engaging the tow line such that the first member is suspended by the tow line from the helicopter for forward movement over the cross-member;

a second member for attachment to the sock-line for pulling the sock-line to a position adjacent the cross-member;

and a rotary member connected between the first member and the second member for the second member to be towed forwardly by the forward movement of the first member;

the rotary member including at least one opening for receiving the cross-member therein;

the rotary member being rotatable to allow said at least one opening to move rearwardly relative to said forward movement of the first and second members so that the second member moves underneath the cross-member as the first member movers over the cross-member;

the rotary member being arranged to maintain connection between the first and second members as said at least one opening moves rearwardly.

Preferably the rotary member includes a plurality of legs defining between one leg and a next leg said at least one opening. In most cases there is a plurality of the legs defining a plurality of openings, but this is not essential.

Preferably the legs maintain connection between the first member and the second member as the rotary member rotates. Typically there are a plurality of legs so that, as the rotary member rotates, at all times at least two of the legs maintain connection between the first member and the second member and define said at least one opening therebetween. The provision of a plurality of legs ensures that at least two hold the structure stable and in a common plane as the rotation occurs.

In a particularly preferred arrangement, the rotary member rotates around a single axis and ends of the legs engage and move along an arcuate member. In this case the rotary member in effect comprises a star wheel where the legs are defined by radially outwardly projecting elements of the star wheel. In this case the ends of the legs engage an arcuate member which is coaxial with the axis of the rotary member. In this case the arcuate member can define a guide track and the ends of the legs include guide elements such as rollers or slides for moving along the guide track. The female guide track can be a channel into which the guide elements engage or can be a male element or rib with the guide elements engaging onto the exterior of the rib However other types of rotary elements are possible for example a conveyor type construction which rotates about at least two axes spaced by an elongate member so that the legs move along the elongate member in parallel spaced arrangement so that the leg ends can slide along a straight guide track.

The rotary member is preferably carried by a link such as a clevis which allows the rotary member relative to the link or inside the clevis.

Preferably the rotary member is carried by the first member so that it is attached to the helicopter by the tow line and the arcuate member is attached to the pilot line. However this arrangement may be reversed.

Preferably the rotary member is unpowered and is driven in rotation by its contact with the cross-member.

According to a second aspect of the invention there is provided a method for stringing a sock-line underneath a cross member of a power line tower comprising:

attaching a tow line to a helicopter;

attaching a first member to the tow line such that the first member is suspended by the tow line from the helicopter for forward movement over the cross-member;

attaching a second member to the sock-line for pulling the sock-line to a position adjacent the cross-member;

connecting the first member to the second member for the second member to be towed forwardly by the forward movement of the first member;

connecting the first member to the second member by a rotary member including at least one opening for receiving the cross member therein;

as the first member passes over the cross member and the second member moves underneath the cross-member in said forward movement, causing the rotary member to rotate to allow said at least one opening to move rearwardly relative to said forward movement of the first and second members so that the cross member passes between the first and second members;

the rotary member being arranged to maintain connection between the first and second members as said at least one opening moves rearwardly.

The arrangement described herein provides a stringing apparatus to facilitate stringing helicopter pulled sock-line onto H-frame, portal, or corset type power line towers, where one or more lines are intended to be suspended within the frame of the tower.

It is understood that the cross member may be attached at each end to uprights which define a closed framed structure. However the same arrangement can contemplate structures that might not be fully closed but have limited access thus not permitting helicopter direct access to string a sock-line onto the block underneath the cross member.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
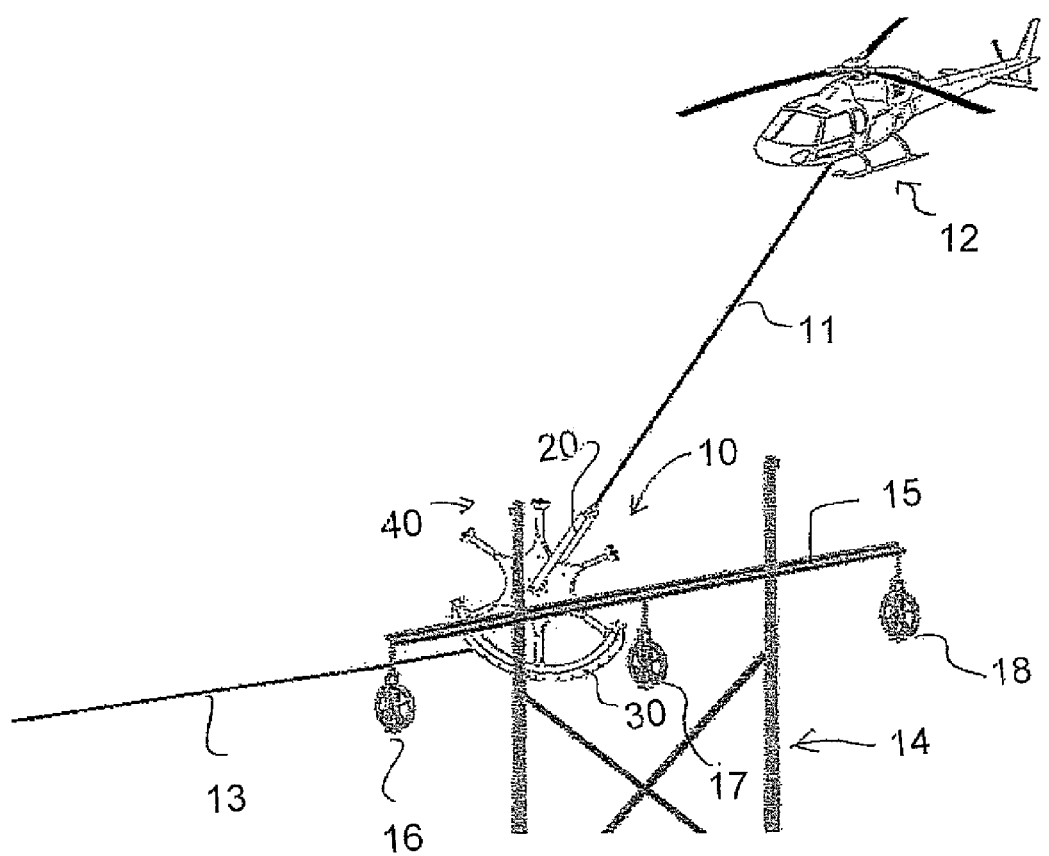
FIG. 1 is an isometric view of one embodiment of the method according to the present invention showing the helicopter with the tow line using the guide apparatus for pulling the sock-line underneath a cross member of the tower.
Figure 2:
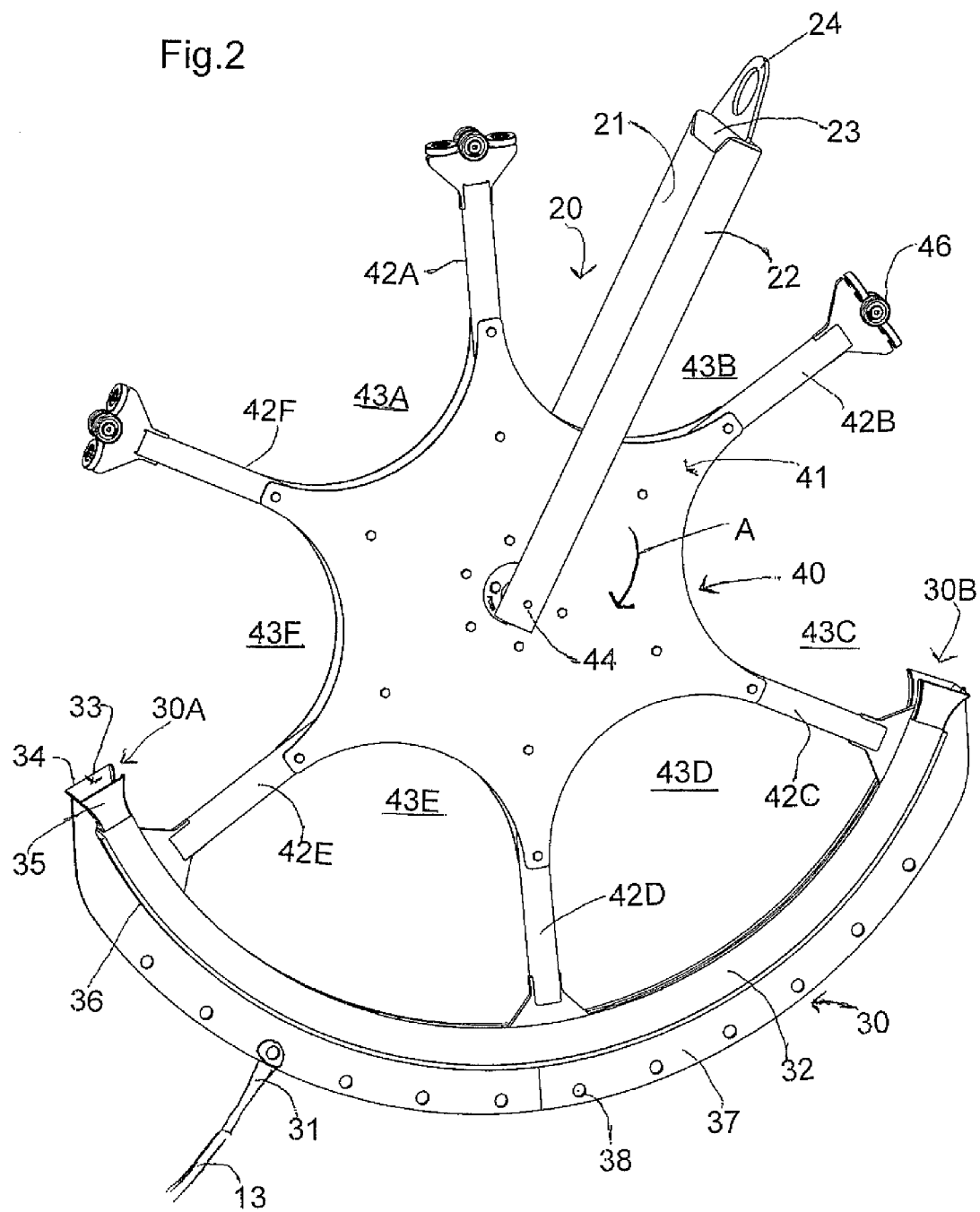
FIG. 2 is an isometric view of the apparatus of FIG. 1.
Figure 3:
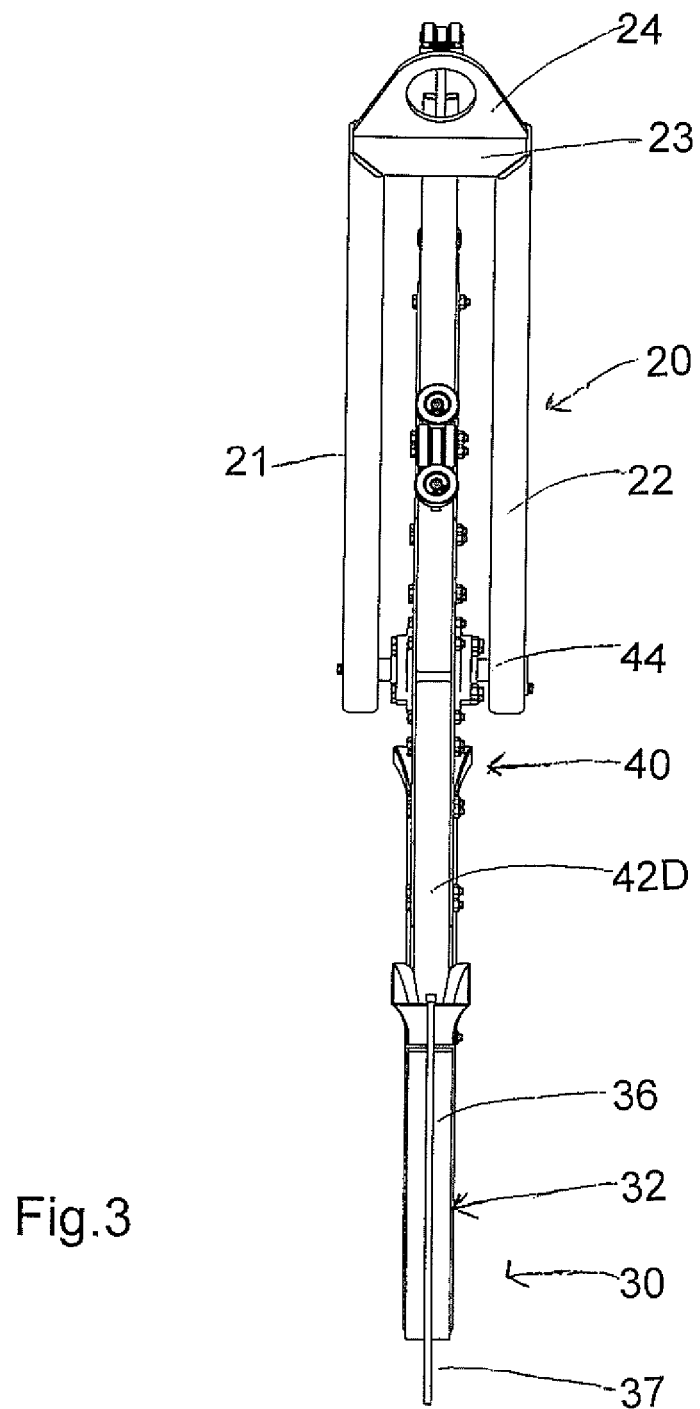
FIG. 3 is front elevational view of the apparatus of FIG. 1.
Figure 4:
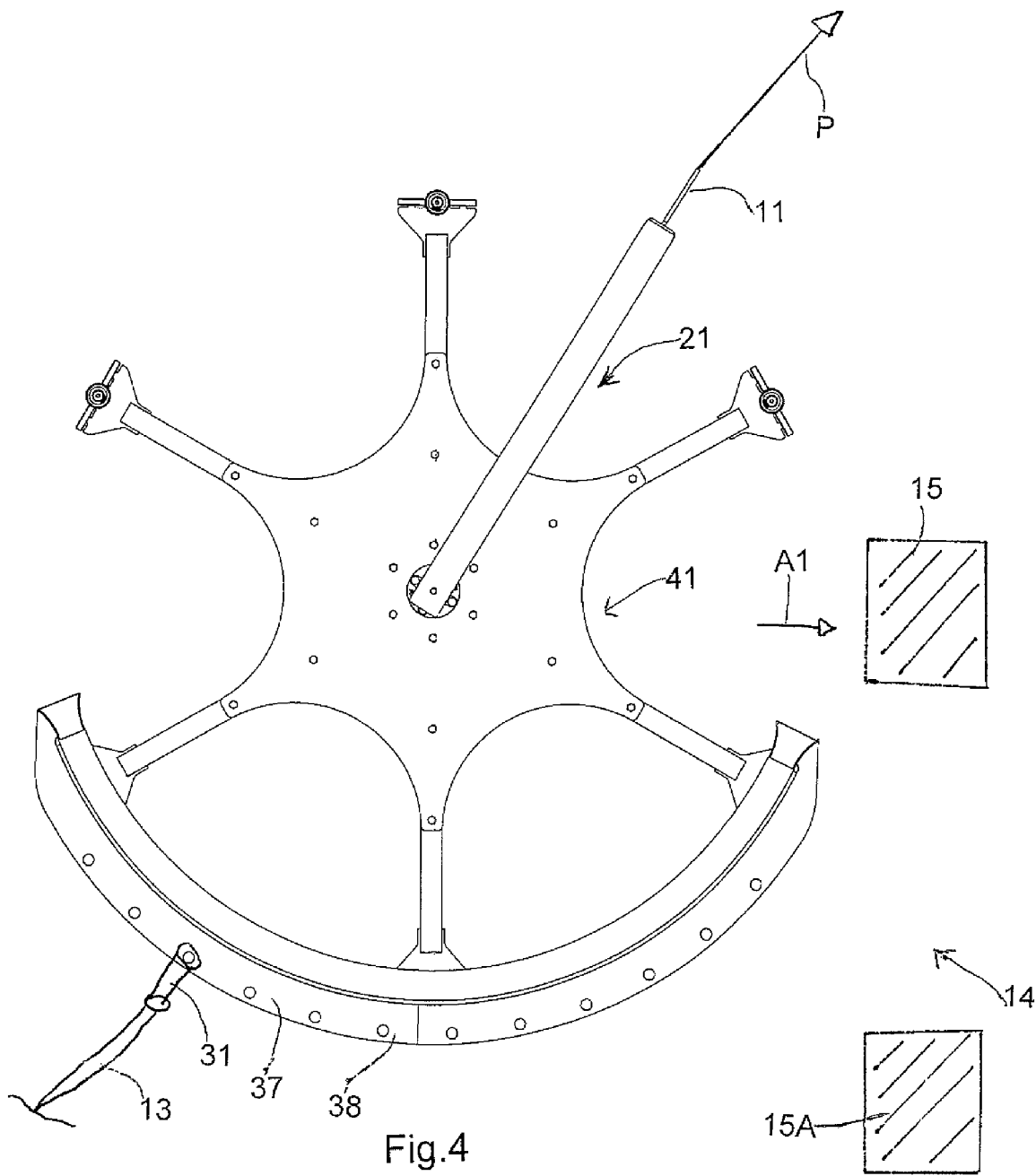
FIGS. 4 to 8 are side elevational views of the steps in the method of FIG. 1
Figure 5:
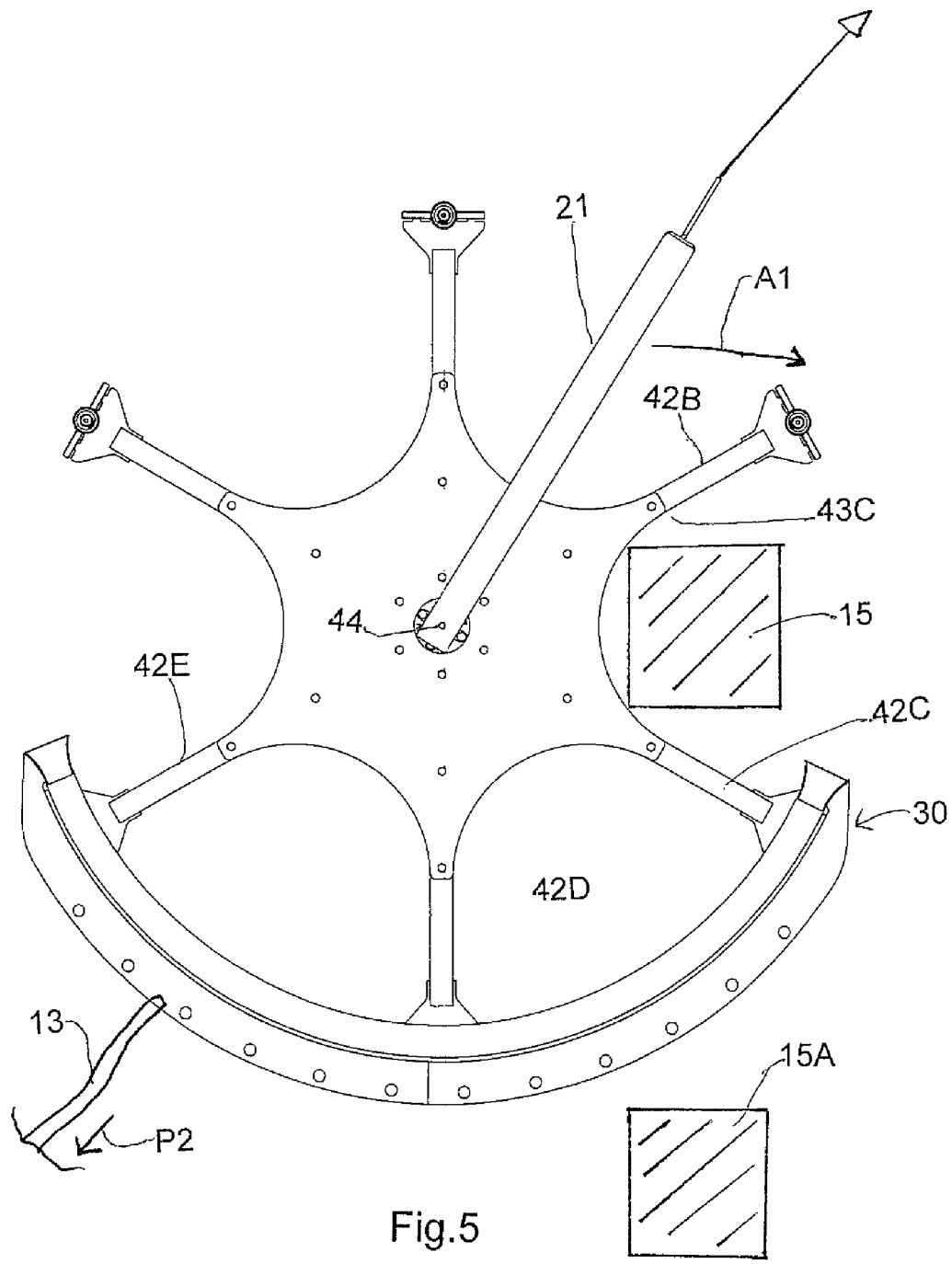

In FIG. 1 an apparatus 10 is provided for attachment to a tow line 11 of a helicopter 12 for stringing a sock-line 13 underneath a cross member 15 of a power line tower 14.

The cross member 15 carries a plurality of line stringing support blocks 16, 17 and 18 for carrying the sock-lines for feeding separate lines of the tower. The blocks 16 and 18 are located externally of the frame so that these can be threaded directly, as is well known. However the block 17 is located within the frame underneath the cross member 15 and between two uprights of the tower. Thus this block cannot be threaded directly because the line 13 must be threaded underneath the cross member 15 while the tow line passes over the top of the cross member 15.

The apparatus 10 comprises a first member 20 in the form of a link or clevis with two side rails 21, 22 connected at the upper end to a cross-piece 23 with a ring 24 for engaging the tow line 11 such that the first member 20 is suspended by the tow line from the helicopter for forward movement over the cross-member 15.

The apparatus 10 comprises a second member 30 for attachment to the sock-line 13 by a shackle or clevis 31 attached to a selected one of a plurality of holes 38 around a flange 37 of the member 30 for pulling the sock-line 13 to a position adjacent the cross-member 15.

The apparatus 10 comprises a rotary member 40 connected between the first member 20 and the second member 30 for the second member 30 to be towed forwardly by the forward movement of the first member 20.

In this embodiment, the rotary member 40 comprises a star wheel 41 with a series of radial legs 42A to 42F where the legs are defined by outwardly projecting elements of the star wheel. The star wheel 41 is rotatable about an axis 44 defined across the base of the clevis 21. The axis extends transverse to the tow line 11 and is arranged in use to lie approximately parallel to the cross member 15.

The rotary member or star wheel 41 includes at least one opening and preferably a series of openings 43A to 43G between the legs 42A to 42F respectively each shaped and arranged for receiving the cross-member 15 therein.

The rotary member or star wheel 41 is rotatable about the axis 44 to allow the openings 43A to 43F to rotate around the axis in the direction of arrow A and thus to move rearwardly relative to said forward movement of the first and second members 20, 30. The length of the clevis 20 is such that the legs of the start wheel move within the clevis and underneath the cross member 23 of the clevis.

In operation the second member 30 moves underneath the cross-member 15 as the first member 20 moves over the cross-member.

The legs 42A to 42F define between each leg and a next leg an opening which is one of the openings 43A to 43F while the legs maintain connection between the first member 20 and the second member 30 as the rotary member 40 rotates.

The ends 45 of the legs engage and move along an arcuate guide track 32 and include guide elements in the form of rollers 46 for moving along the guide track which is formed by a channel 33 formed between two side walls 34, 35 and a base 36. The side walls 34 and 35 are shaped with an in-turned upper edge to retain the rollers within the channel so that they must travel along the channel The rollers 46 are arranged to run in the guide channel so that as each emerges from one end 30A of the channel, another enters the channel. In this way at least two legs of the star wheel are engaged into the channel at any one time to ensue that the channel is held in stable position coaxial with the axis 44.

The rotary member 40 is unpowered and is driven in rotation by contact with the cross-member and by the pulling action of the tow line 11 and the sock-line 13.

In operation, as shown in FIGS. 4 to 8, the clevis 21 is attached to the tow line 11 pulled at P by the helicopter. The base flange 37 projects outwardly from the base 36 of the channel 32 to provide an attachment for the shackle 31 attached to the sock-line 13.

With the sock-line being thus towed into place by forward movement along a direction of arrow A1 to a position adjacent a cross member 15 of a tower 14, the star wheel is brought up into contact with the cross member 15 which enters one of the recesses which is at the forward position at this time. In the position shown in FIG. 5 this is the recess 43C located between legs 42B and 42C. The pulling force P pulls the clevis 21 upwardly and forwardly so that the axle defining the axis 44 of rotation wants to pass over the cross member 15. At the same time the sock-line exerts a drag P12 on the channel 32 defining the second member so that the channel 32 wants to pass underneath the cross member 15 and over a next adjacent beam or cross member 15A of the tower below the cross member 15.

Figure 6:
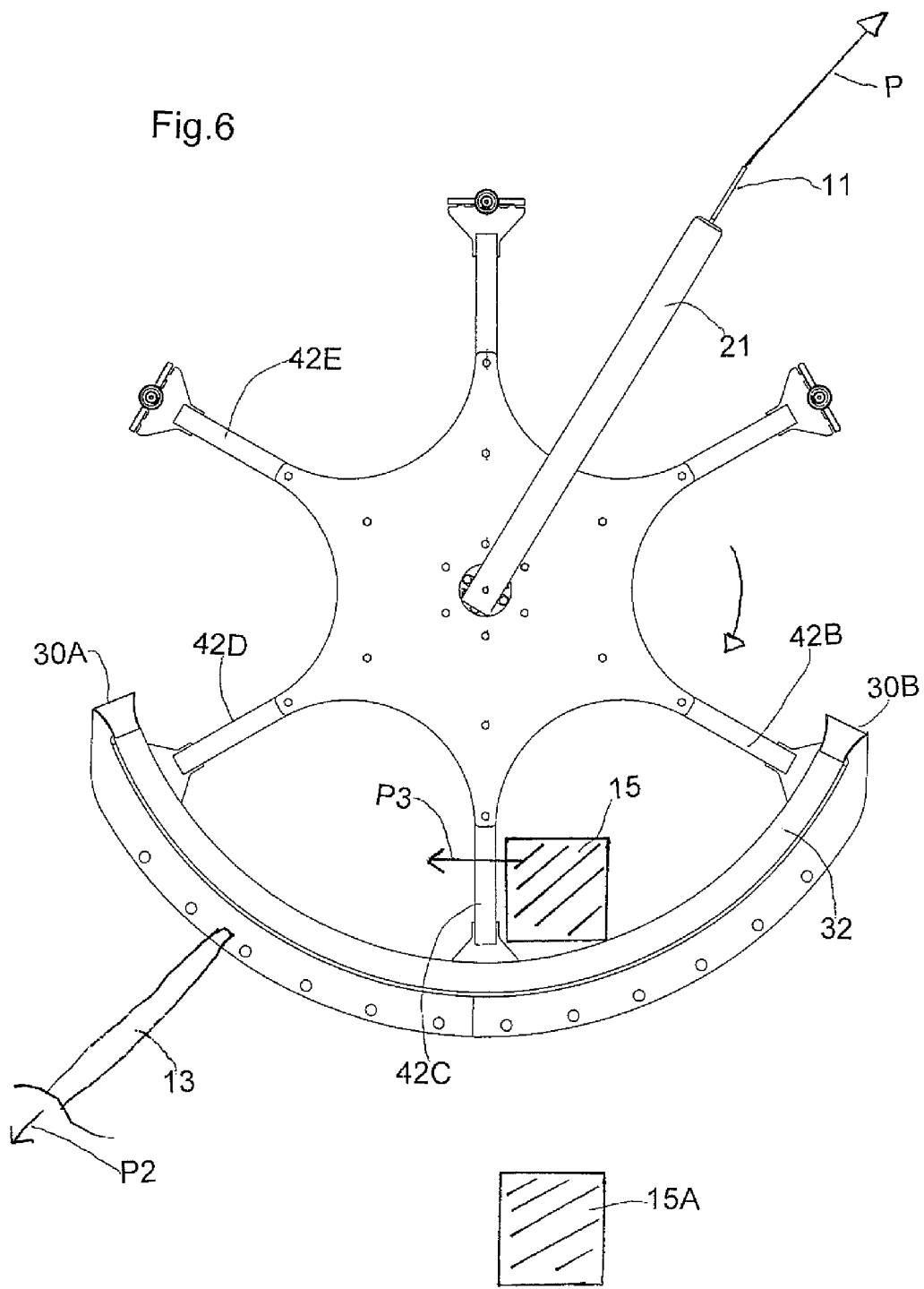
Figure 7:
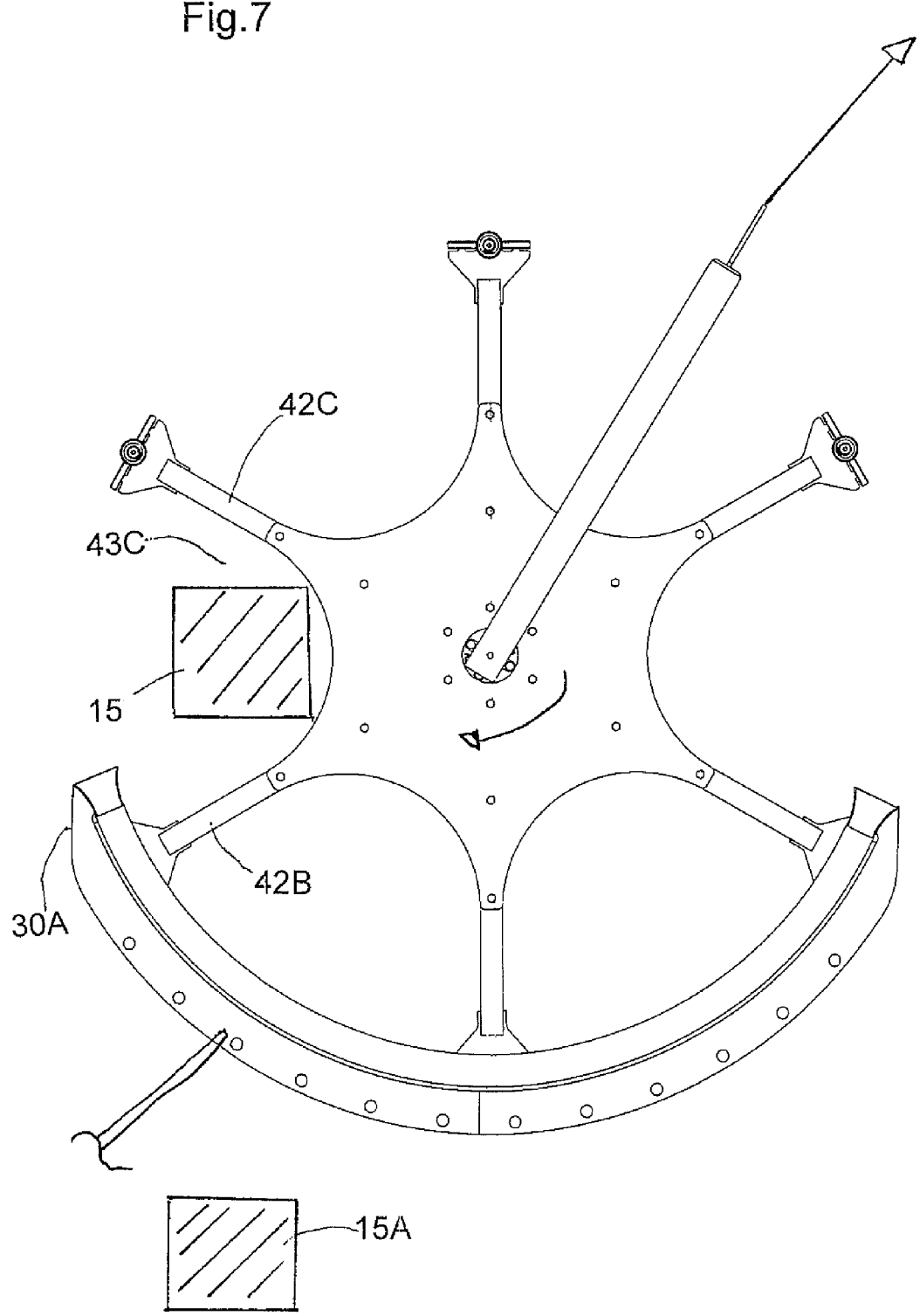
Figure 8:
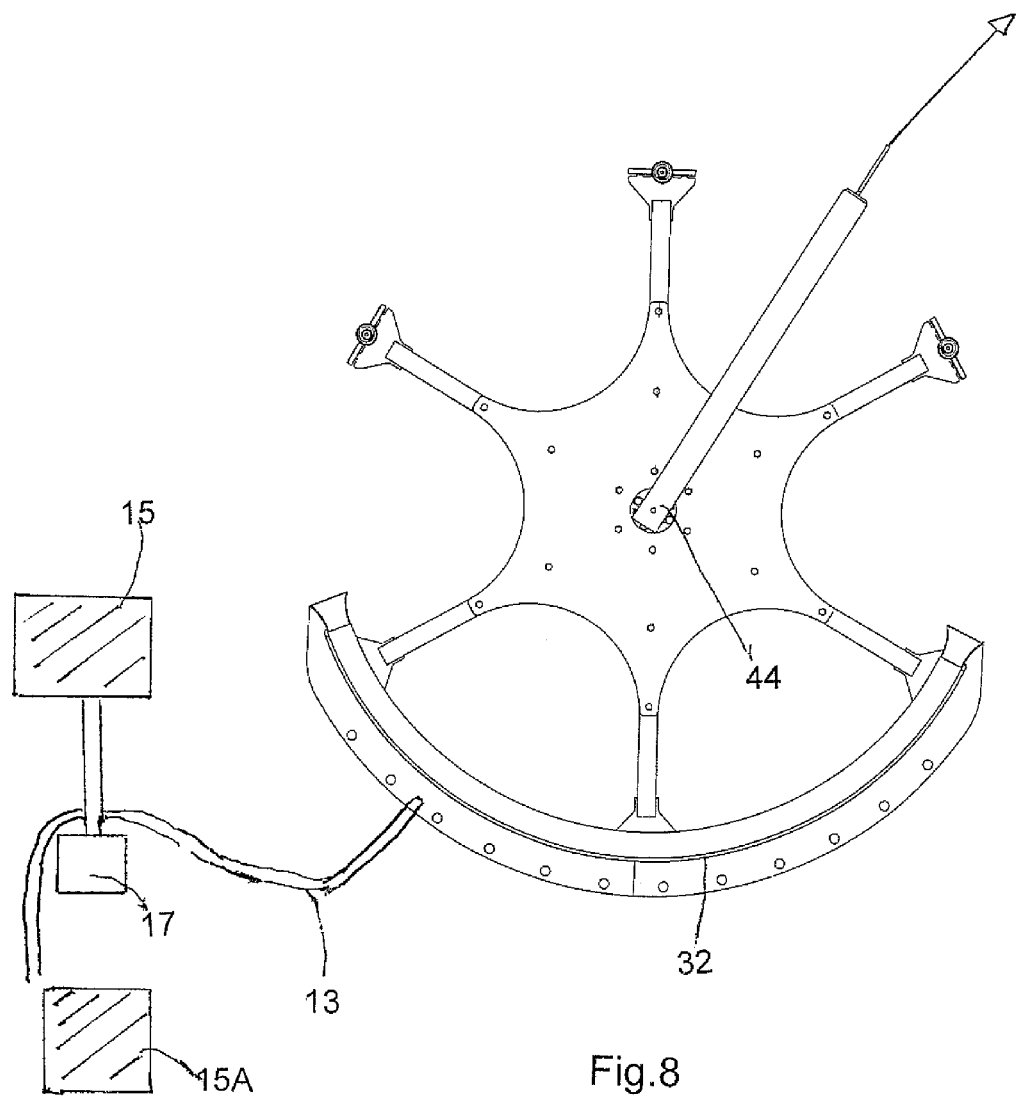

As shown in FIG. 6, the forces on the components provided by the pulling forces P and P2 together with the force P3 from the contact between the cross member 15 and the leg 42C acts to cause rotation of the star wheel around its axis 44 so that the legs move rearwardly relative to the forward movement of the tow line and channel. Thus the leg 42B rotates into the channel 32 entering the end 30B while the leg 42E rotates away from the end 30A. This rotation continues as shown in FIG. 7 until the opening 43C escapes the end 30A of the channel when the leg 42B reaches the end 30A. This allows the cross member 15 to be released from the opening 43C and the apparatus continues to move forward into the position shown in FIG. 8 where the channel 32 has passed underneath the member 15 and the axle 44 has passed over the member 15 causing the sock-line to be threaded between the members 15 and 15A and onto the block 17. The apparatus can then be towed to the next tower for a similar threading action.

When the sock-line is threaded through each tower and over the blocks 17, the sock-line can be used to pull through the power line to be suspended from the towers. The use of a sock-line 13 and the blocks 17 is conventional and well known to a person skilled in the art so that no detailed description of these elements s required.

The apparatus of the present invention provides a simple non-powered device for threading the sock-line underneath the cross members 15. it will be appreciated that the use of a star wheel which is symmetrical about its axis allows the star wheel to approach each tower in a suitable orientation with one of the opening 43A to 43F available to receive the cross member as it approaches the star wheel.

The invention claimed is:

1. Apparatus for attachment to a tow line of a helicopter for stringing a sock-line underneath a cross member of a power line tower comprising:
   a first member for engaging the tow line such that the first member is suspended by the tow line from the helicopter for forward movement over the cross-member;
   a second member for attachment to the sock-line for pulling the sock-line to a position adjacent the cross-member;
   and a rotary member connected between the first member and the second member for the second member to be towed forwardly by the forward movement of the first member;
   the rotary member including at least one opening for receiving the cross-member therein;
   the rotary member being rotatable to allow said at least one opening to move rearwardly relative to said forward movement of the first and second members so that the second member moves underneath the cross-member as the first member movers over the cross-member;
   the rotary member being arranged to maintain connection between the first and second members as said at least one opening moves rearwardly.

2. The apparatus according to claim 1 wherein the rotary member includes a plurality of legs defining between each leg and a next leg said at least one opening.

3. The apparatus according to claim 2 wherein the legs maintain connection between the first member and the second member as the rotary member rotates.

4. The apparatus according to claim 2 wherein the rotary member rotates around a single axis and ends of the legs engage and move along an arcuate member.

5. The apparatus according to claim 4 wherein the arcuate member defines a guide track and the ends of the legs include guide elements for moving along the guide track.

6. The apparatus according to claim 5 wherein the guide elements comprise rollers.

7. The apparatus according to claim 4 wherein the rotary member comprises a star wheel where the legs are defined by outwardly projecting elements of the star wheel.

8. The apparatus according to claim 2 wherein the rotary member is carried by a link which allows the rotary member to rotate relative to the link.

9. The apparatus according to claim 8 wherein the link is a clevis within which the rotary member rotates.

10. The apparatus according to claim 1 wherein the rotary member is carried by the first member.

11. The apparatus according to claim 3 wherein, as the rotary member rotates, at all times at least two of the legs maintain connection between the first member and the second member and define said at least one opening therebetween.

12. The apparatus according to claim 1 wherein the rotary member is unpowered and is driven in rotation by contact with the cross-member.

13. A method for stringing a sock-line underneath a cross member of a power line tower comprising:
   attaching a tow line to a helicopter;
   attaching a first member to the tow line such that the first member is suspended by the tow line from the helicopter for forward movement over the cross-member;
   attaching a second member to the sock-line for pulling the sock-line to a position adjacent the cross-member;
   connecting the first member to the second member for the second member to be towed forwardly by the forward movement of the first member;
   connecting the first member to the second member by a rotary member including at least one opening for receiving the cross member therein;
   as the first member passes over the cross member and the second member moves underneath the cross-member in said forward movement, causing the rotary member to rotate to allow said at least one opening to move rearwardly relative to said forward movement of the first and second members so that the cross member passes between the first and second members;
   the rotary member being arranged to maintain connection between the first and second members as said at least one opening moves rearwardly.

14. The method according to claim 13 wherein the rotary member includes a plurality of legs defining between each leg and a next leg said at least one opening.

15. The method according to claim 14 wherein the legs maintain connection between the first member and the second member as the rotary member rotates.

16. The method according to claim 14 wherein the rotary member rotates around a single axis and ends of the legs engage and move along an arcuate member.

17. The method according to claim 16 wherein the arcuate member defines a guide track and the ends of the legs include guide elements for moving along the guide track.

18. The method according to claim 14 wherein, as the rotary member rotates, at all times at least two of the legs maintain connection between the first member and the second member and define said at least one opening therebetween.

19. The method according to claim 13 wherein rotary member is carried by the first member.

* * * * *